US010708309B2

(12) United States Patent
Bharadwaj et al.

(10) Patent No.: US 10,708,309 B2
(45) Date of Patent: Jul. 7, 2020

(54) FINE GRANULARITY AUTHORIZATION CONTROL IN FC-NVME STORAGE AREA NETWORK

(71) Applicant: Cisco Technology, Inc., San Jose, CA (US)

(72) Inventors: Harsha Bharadwaj, Bangalore (IN); J Michel Metz, Burnet, TX (US)

(73) Assignee: Cisco Technology, Inc., San Jose, CA (US)

( * ) Notice: Subject to any disclaimer, the term of this patent is extended or adjusted under 35 U.S.C. 154(b) by 204 days.

(21) Appl. No.: 15/867,109

(22) Filed: Jan. 10, 2018

(65) Prior Publication Data

US 2019/0215341 A1    Jul. 11, 2019

(51) Int. Cl.
*H04L 29/06* (2006.01)
*H04L 29/08* (2006.01)
*H04L 12/931* (2013.01)
*H04L 12/743* (2013.01)

(52) U.S. Cl.
CPC ............ *H04L 63/20* (2013.01); *H04L 49/357* (2013.01); *H04L 63/0236* (2013.01); *H04L 63/0263* (2013.01); *H04L 63/164* (2013.01); *H04L 67/1097* (2013.01); *H04L 45/7457* (2013.01)

(58) Field of Classification Search
CPC ..... H04L 63/20; H04L 63/164; H04L 49/357; H04L 45/7457
See application file for complete search history.

(56) References Cited

U.S. PATENT DOCUMENTS

| 9,565,050 B1 | 2/2017 | Desanti | |
| 2007/0083672 A1* | 4/2007 | Shima | H04L 29/12924 709/245 |
| 2012/0023507 A1* | 1/2012 | Travis | G06F 9/45537 719/319 |

(Continued)

OTHER PUBLICATIONS

Lin et al., "Power-aware virtual machine mapping in the data-center-on-a-chip paradigm," 2016 IEEE 34th International Conference on Computer Design (ICCD) Year: 2016 | Conference Paper | Publisher: IEEE.*

(Continued)

*Primary Examiner* — Roderick Tolentino
(74) *Attorney, Agent, or Firm* — Edell, Shapiro & Finnan, LLC

(57) ABSTRACT

A method is performed at a Fibre Channel (FC) switch of an FC switch fabric through which servers connected to the FC switch fabric access logical partitions of a storage array connected to the FC switch fabric. The FC switch receives from the storage array information indicative of port zoning rules and logical partition masking that collectively define which server ports are permitted access to which storage array ports and to which logical partitions of the storage array. The FC switch generates from the information authorization rules for enforcing the port zoning rules and the logical partition masking, and programs the authorization rules into memory. The FC switch receives FC frames from the server ports. The FC frames convey respective input-output (IO) operations destined for the logical partitions. The FC switch authorizes each IO operation based on a lookup of the programmed authorization.

20 Claims, 7 Drawing Sheets

(56) References Cited

U.S. PATENT DOCUMENTS

| | | | | |
|---|---|---|---|---|
| 2012/0084071 | A1* | 4/2012 | Cyr | G06F 11/0712 703/25 |
| 2012/0218990 | A1* | 8/2012 | Subramanyan | H04L 49/30 370/357 |
| 2013/0268800 | A1* | 10/2013 | Rangaiah | G06F 11/2033 714/4.11 |
| 2014/0129797 | A1* | 5/2014 | Arndt | G06F 12/1027 711/206 |
| 2015/0341354 | A1* | 11/2015 | Stevens | G06F 9/45558 726/5 |
| 2016/0328348 | A1* | 11/2016 | Iba | G06F 9/5077 |
| 2017/0222906 | A1* | 8/2017 | Johnsen | H04L 49/25 |
| 2019/0034120 | A1* | 1/2019 | Barczak | G06F 3/0644 |

OTHER PUBLICATIONS

Ramezani et al., "A multi-objective optimization model for virtual machine mapping in cloud data centres," 2016 IEEE International Conference on Fuzzy Systems (FUZZ-IEEE) Year: 2016 | Conference Paper | Publisher: IEEE.*

Erik Smith, "Introducing Target Driven Zoning (TDZ)", Jan. 16, 2012, Brass Tacks, 7 pages.

"Configuring and Managing Zones", Chapter 24, Cisco MDS 9000 Family CLI Configuration Guide, OL-18084-01, Cisco MDS NX-OS Release 4.x, downloaded Jan. 9, 2018, 42 pages.

"Fibre Channel—Link Services—3 (FC-LS-3)", American National Standard for Information Technology, INCITS xxx-20xx Link Services—3 Rev 3.51, Oct. 5, 2016, BSR INCITS 111-20xx, T11/ Project 2103-D/Rev 3.51, pp. 1-100.

"Fibre Channel—Link Services—3 (FC-LS-3)", American National Standard for Information Technology, INCITS xxx-20xx Link Services—3 Rev 3.51, Oct. 5, 2016, BSR INCITS 111-20xx, T11/ Project 2103-D/Rev 3.51, pp. 101-200.

"Fibre Channel—Link Services—3 (FC-LS-3)", American National Standard for Information Technology, INCITS xxx-20xx Link Services—3 Rev 3.51, Oct. 5, 2016, BSR INCITS 111-20xx, T11/ Project 2103-D/Rev 3.51, pp. 201-230.

* cited by examiner

FINE GRANULARITY AUTHORIZATION CONTROL IN FC-NVME STORAGE AREA NETWORK

TECHNICAL FIELD

The present disclosure relates to authorization control of Input-Output (IO) operations in a Fibre Channel (FC) switch fabric.

BACKGROUND

A Fibre Channel (FC) storage area network (SAN) environment includes servers that perform IO Input-Output (IO) operations on logical partitions of a storage array over an FC switch fabric. The SAN environment authorizes the IO operations, and permits only authorized IO operations to pass from the servers to the logical partitions. Using conventional authorization techniques, the SAN environment performs two-stage authorization of the IO operations. In a first stage, the FC switch fabric enforces port zoning rules on the IO operations passing through the FC switch fabric. This stage ensures only zoned source FC identifiers (FCIDs) (SIDs) and destination FCIDs (DIDs) are communicating with each other. In a second stage, the storage array enforces logical partition masking, such as logical unit number (LUN) masking and namespace identifier (NSID) masking, on the IO operations arriving at the storage array. This stage ensures only authorized server SIDs perform IO operations on the logic partition. Thus, the two-stage authorization distributes authorization enforcement across different types of entities in the SAN environment, which adds both complexity and latency to the authorization process.

DESCRIPTION OF EXAMPLE EMBODIMENTS

Overview

Figure 1:
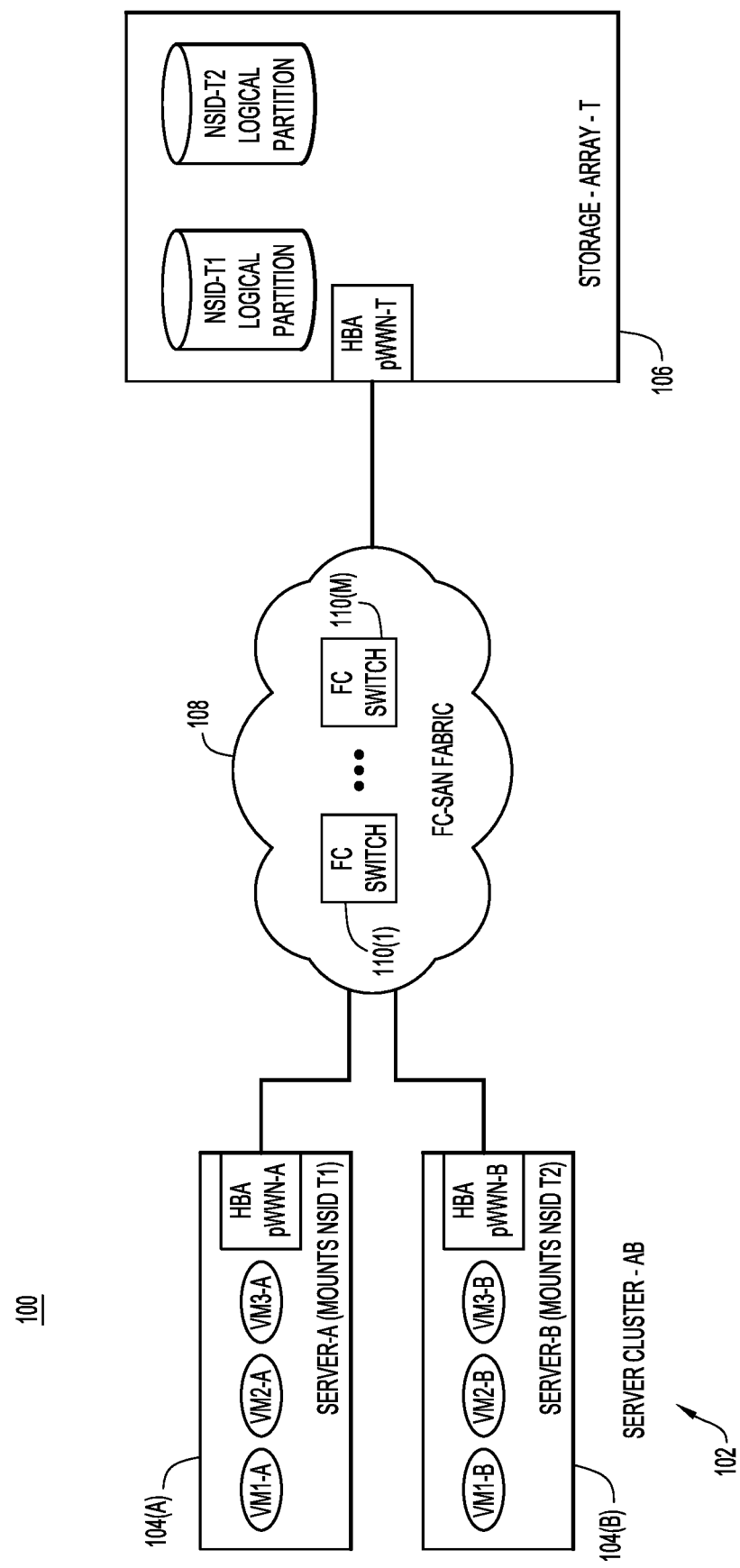
FIG. 1 is a high-level block diagram of a storage area network (SAN) environment in which embodiments directed to configuring fine grained authorization rules for IO operations, and enforcing the authorization rules against the IO operations, may be performed, according to example embodiment.

In one embodiment, a method is performed at a Fibre Channel (FC) switch of an FC switch fabric through which servers connected to the FC switch fabric access logical partitions of a storage array connected to the FC switch fabric. The FC switch, the servers, and the storage array each include multiple respective ports. The FC switch receives from the storage array information indicative of port zoning rules and logical partition masking that collectively define which server ports are permitted access to which storage array ports and to which logical partitions of the storage array. The FC switch generates from the information authorization rules for enforcing the port zoning rules and the logical partition masking, and programs the authorization rules into memory, e.g., a memory lookup region, such as a Ternary Content Addressable Memories (TCAM). The FC switch receives at the switch ports FC frames from the server ports. The FC frames convey respective input-output (IO) operations destined for the logical partitions. The FC switch authorizes each IO operation based on a lookup of the programmed authorization rules to enforce both the zoning rules and the logical partition masking on the IO operation at the switch.

Example Embodiments

Authentication, Authorization, and Accounting (AAA) are three tenets for effective network management and security. Authentication provides a way of identifying a user, usually with a user name and a password before access is granted. Authorization determines whether the user has authority to perform a specific action. Accounting measures and keeps track of user activity. In an FC fabric, end device (servers and targets) authentication may be performed during device login as specified by the InterNational Committee for Information Technology Standards (INCITS) T11 FC-Security Protocol (SP) (FC-SP) security framework, for example. Authorization may be performed per zoning configurations that specify rules by which server port World Wide Names (pWWNs) may communicate with which target pWWNs via the FC fabric.

Zoning servers and storage is an important security feature in FC SANs. Zoning is an authorization feature that provides for port level security in FC SANs. Zoning defines zones of pWWNs that identify boundaries of which server ports (i.e., initiator ports) can be allowed to communicate with which storage array ports (i.e., target ports) of storage arrays. There are two forms of zoning implementations, including hard and soft zoning. The hard zoning is a stricter form of zoning implemented by the way of frame-by-frame enforcement of zoning rules in hardware using ternary content-addressable memory (TCAM). The pWWNs are resolved into FC identifiers (FCIDs) by a zone server service hosted on a switch in a switch fabric, and programmed into TCAM on the switch as a set of <source FCID, destination FCID> permit entries. A default "catch-all" deny entry drops frames not matching any of the zoning rules. Soft zoning refers to a method of zoning that limits information about devices based upon their own access restrictions; subsequent references to zoning made herein are to hard zoning.

Logical unit numbers (LUNs) in the SCSI protocol define a logical partition of physical storage and are each represented by a 64-bit LUN-ID. Storage arrays supporting the SCSI protocol provide for another level of authorization with a feature referred to as "LUN masking." LUN masking is configured with rules that specify which server pWWN ports can access a specific LUN on a storage port pWWN and provides for LUN-level security. Even though some storage array implementations provide for grouping of LUNs as storage groups and provide collective enforcement for all of them, for the sake of simplicity LUN masking can be considered per-LUN authorization/access enforcement. The enforcement is possible in two ways similar to zoning—either when servers scan for LUNs using SCSI REPORT LUNs (soft implementation), or for every SCSI input-output (IO) operation initiated by a server (hard implementation). Most storage arrays have an "authorization database" configured by an administrator and implemented within the storage array against which every server access request is enforced through authorization database lookups. Since storage array disk-based lookups can slowdown IO operations, a memory cache of this database is often maintained in storage processor memory.

A security best practice configures both zoning in the FC fabric and LUN masking on storage arrays; however, performing both types of configurations (i.e., two-stage configurations and authorization enforcement) duplicates authorization effort and increases operational complexity when adding/decommissioning devices or adding/deleting virtual machines (VMs) on the servers or LUNs on the storage arrays. Moving away from such duplicative effort, ideally, the operator would configure authorization rules only once, the configured rules would be automatically enforced across the FC fabric, thus obviating the need for zoning configuration in the FC fabric. Target Driven Zoning (TDZ) is a service used by storage array vendors where the zoning configuration is deduced based on the LUN masking configuration on the storage array. The deduced zones are pushed from the storage arrays to the FC fabric as, for example, T11-defined Peer-Zones using FC-Generic Service (GS) Add/Replace Active Peer Zone (AAPZ) operation. This eliminates the need to explicitly configure and activate zoning in the FC fabric without compromising security aspects. With TDZ, LUN masking is the only explicit configuration specified by the administrator on the storage array.

In an example, NX-Operating System (OS) software on Cisco Multilayer Director Switch (MDS) switches implement a feature of a LUN zone where in the zoning configuration, in addition to a target pWWN member, a LUN ID may also be specified; however, this feature is duplicative because it provides a functionality similar to LUN masking. Moreover an 8 byte LUN ID defined as a hierarchical structure with different encoding formats (as in the SCSI Architecture Module (SAM) defined by T10 standard) is considered difficult to decipher and configure in the FC fabric when compared to implementing similar functionality in the storage array. The authorization enforcement at a LUN level using Access Control List (ACL) TCAMs on the MDS switch has been avoided due to its complexity owing to different LUN formats advertised by the storage arrays, often with vendor-specific encodings within them.

Deterministic data storage systems are ubiquitous in modern data centers supporting big-data, high-performance computing, database, and other common applications. More mission-critical storage systems are networked together using Fibre Channel (FC) than any other technology. Recent developments in storage have brought several new technologies to the market, including Non-Volatile Memory (NVM) (such as Flash and Solid State Devices (SSDs)). As a result, a new storage command set has been developed by the Non-Volatile Memory Express group, called "NVMe." Extensions to this standard have included Fibre Channel solutions. While many of the functional implementations are similar to traditional Small Computer System Interface (SCSI) approaches, NVMe brings several enhancements that can be exercised within a FC network that enhances security beyond the capabilities of previous storage area network (SAN) FC switch fabric (referred to more simply as "FC fabric") types. NVMe is a next-generation media access protocol replacing SCSI as the media protocol of choice, especially with all-flash storage arrays.

The NVMe protocol defines the concept of a namespace (NS) as a collection of logical blocks that range from 0 to a capacity of the (namepace−1). In contrast to a LUN, a namespace identifier (NSID) is a flat 32-bit identifier used by a storage array controller to provide access to a namespace. NSIDs are unique within a subsystem and hence a (subsystem port, NSID) combination or tuple is globally unique. NVMe 1.3 also recommends that NSIDs remain static across power-off conditions or namespace management functions. Zoning configurations in a FC-NVMe fabric zone together NVMe-capable server ports and NVMe-capable storage ports. The corollary to LUN masking in the NVMe world is referred to as NSID-masking, which defines which server pWWN can access a given NSID.

The performance of NVMe in terms of IO operations per second (IOP S)/throughput is expected to increase to several-fold due to massive amounts of parallelism possible with the NVMe protocol compared to the SCSI protocol. The NVMe host-to-storage latencies are in sub-microsecond ranges and when extended over FC fabrics, an overall end-to-end latency is expected to be on the order of only a few microseconds. Given the highly latency-sensitive environments of NVMe-FC fabrics, it is important to reduce latency for IO operations. Conventional two-step/stage authorization ((1) zoning in the Fabric+(2) NSID masking in the storage array) adds end-to-end latency.

Data Centers have become increasingly virtualized, thus proliferating VMs across servers. To provide for VM visibility to the FC fabric and storage devices/arrays, the FC-Link Service (LS)-3 T11 defined FC-LS-3 Spec defines "Priority Tagging" as a frame-by-frame tagging mechanism performed by initiators for any server virtualized entity (including VMs and containers). The virtualized entity is generically referenced as a VM in the ensuing description. Conventionally, to support features such as VM mobility (e.g.: ESXi vMotion), both source and destination servers involved in a VM move should "see" the same storage LUNs with identical LUN IDs. To satisfy this requirement, zoning the server pWWN and all possible VM move destination server pWWNs with the storage port pWWN is required, even when the actual intent is to zone only the VM and its storage port. This is counterintuitive to the way in which zoning is implemented, and also defeats the purpose of zoning, thus preventing any VM hosted on the servers from being able to access the LUN on the storage device port. While distributed file systems (e.g., Virtual Machine File System (VMFS)) controls multiple VMs accessing a same file using an SCSI-level locking mechanism, a raw access of the LUN (e.g., raw device mapping (RDM) mode of ESXi) from a VM can expose a security vulnerability that can corrupt data on the LUN. The same limitation exists as the storage protocols transition from SCSI to NVMe, such that a rogue VM on a server pWWN that is zoned with a target pWWN may be able to perform reads/writes to an NSID that the VM does not own.

Embodiments described below represent a solution that overcomes the two main problems described above. The solution comprises the following features/elements:

a. Combining port zoning and NSID masking into a single-step/stage authorization procedure within the FC fabric.

b. Extending the single-step authorization to also include VM credentials (e.g., a VM identifier (VMID), such as a VM universal unique identifier (UUID)). This introduces a fully-qualified tuple of <server port pWWN, server VMID, target port pWWN, target NSID>, which may be authorized "one-shot" using a single lookup operation against ACL TCAM entries on a per-IO operation basis in the FC fabric.

c. Using TDZ to eliminate the configuration burden on the SAN administrator by automating parts of the zoning.

d. Extending the NSID masking configuration to optionally take a Global VM UUID as input to specify which NSID may be accessed by the VM behind a given server port pWWN.

With reference to FIG. 1, there is a block diagram of an example SAN environment 100 in which embodiments presented herein may be implemented. FIG. 1 shows SAN environment 100 prior to when the SAN environment is configured for authorization of IO operations. SAN environment 100 includes a server cluster 102 including servers 104(A) and 104(B) (collectively, "servers 104"), a storage array 106 for storing data, and an FC-SAN switch fabric 108 (also referred to as FC fabric 108) connected to the servers and the storage array. FC fabric 108 includes multiple FC switches 110(1)-110(M) (collectively, FC switches 110) connected with each other, servers 104, and storage array 106 via switch ports of the FC switches. Servers 104, storage array 106, and FC switches 110 of FC fabric 108 and their respective server ports, storage array ports, and switch ports all support/operate in accordance with the FC-NVMe protocol. FC-NVMe is a technology specification designed to enable NVMe-based message commands to transfer data and status information between a host computer and a target storage subsystem over an FC fabric. For example, in SAN environment 100, the respective ports of servers 104, storage array 106, and FC switches 110 are configured to exchange FC frames transporting NVMe IO operations.

Server 104(A) includes a server port identified by pWWN-A provided by a host bus adaptor (HBA) and connected to a corresponding switch port of one of FC switches 110 in switch fabric 108 (not shown in FIG. 1). Server 104(A) hosts multiple VMs VM1-A to VM3-A configured to communicate with FC fabric 108 through server port pWWN-A. Similarly, server 104(B) includes a server port pWWN-B provided by an HBA and connected to a corresponding switch port of switch fabric 108 (not shown in FIG. 1). Server 104(B) hosts multiple VMs VM1-B to VM3-B configured to communicate with FC fabric 108 through server port pWWN-B.

Storage array 106 includes physical storage divided into two logical partitions identified by logical partition identifiers, e.g., NSIDs, NSID-T1 and NSID-T2. Storage array 106 also includes a storage array port pWWN-T of an HBA connected to a corresponding switch port of switch fabric 108 (not shown in FIG. 1). In operation, servers 104 perform IO operations (e.g., read and write operations) on logical partitions NSID-T1 and NSID-T2 over FC fabric 108 through an exchange of FC frames between severs ports pWWN-A and pWWN-B and storage array port pWWN-T. The FC frames encode the IO operations in an NVMe defined format, as is known.

In FIG. 1, server cluster 102, server 104(A), server 104(B), storage array 106, and FC fabric 108 are alternatively referred as server cluster AB, server A, server B, storage array T, and FC-SAN fabric, respectively. Also, it is understood that FIG. 1 is only an example, and the SAN environment may include many more servers and storage arrays, and each server and storage array typically includes multiple ports.

Embodiments for configuring FC switches 110 of FC fabric 108 with authorization rules for IO authorization, and enforcing the authorization rules against IO operations are now described below in connection with FIGS. 2-6.

Figure 2:
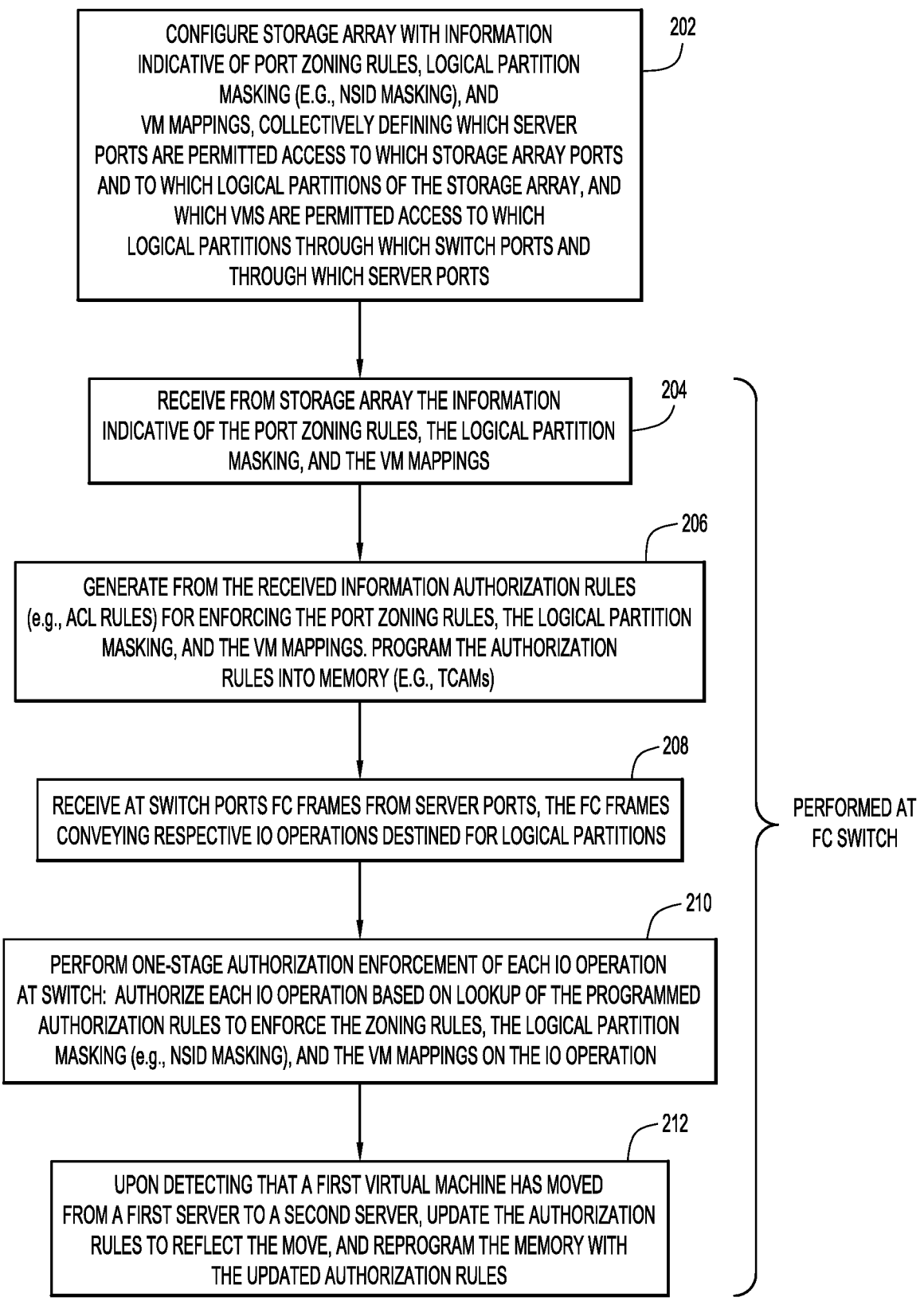
FIG. 2 is a flowchart of a method of configuring an FC switch fabric of the SAN environment with fine grained authorization rules to be enforced against IO operations, and enforcing the authorization rules against the IO operations, according to example embodiment.

With reference to FIG. 2, there is a flowchart of an example method 200 of configuring FC fabric 108 with fine grained authorization rules for IO operations (i.e., an authorization configuration process), and enforcing the authorization rules against the IO operations on a per-IO operation basis, in a one-step/stage enforcement action in the FC fabric. The flowchart of FIG. 2 is described also with reference to FIGS. 3-6, which show SAN environment 100 at various stages in the authorization configuration process.

With reference to FIG. 2, at 202, an administrator configures initial authorization rules on storage array 106. In an example, the administrator enters the initial authorization rules into an NSID masking database accessible to storage array 106. The initial authorization rules are indicative of (i) port zoning rules defining which storage server ports (e.g., sever ports pWWN-A and pWWN-B) are permitted to access which storage array ports (e.g., port pWWN-T), and (ii) NSID masking (more generally referred to as "logical partition masking") defining which storage array ports are able to access which logical partitions (e.g., NSID-T1 and NSID-T2). The NSID masking represents information indicative of (permitted) NSID mappings between storage array ports and NSIDs. The initial authorization rules also optionally include VM mapping defining which VMs (e.g., VMs VM1-A to VM3-A) hosted on servers 102 are able to access which storage array ports and which logical partitions via which server ports. Thus, in operation 202, storage array 106 receives the aforementioned initial authorization rules and stores the initial authorization rules in the NSID masking database. The initial authorization rules may be stored in the NSID masking database as entries in the form of rule tuples, as illustrated in FIG. 3.

Figure 3:
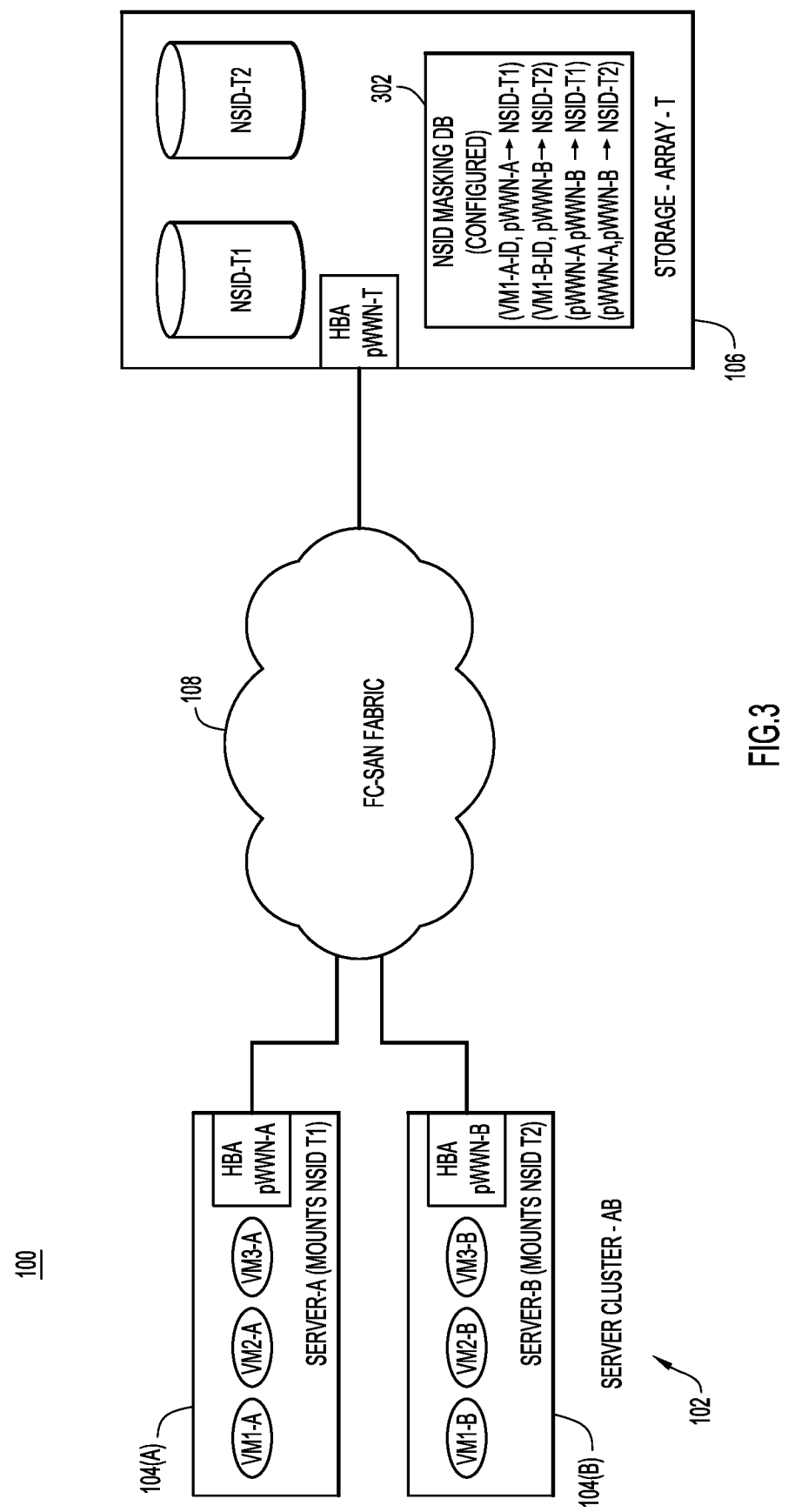
FIG. 3 is an illustration of a namespace identifier (NSID) masking database of a storage array of the SAN environment after initially configuring the database, according to an example embodiment.

With reference to FIG. 3, there is an illustration of an NSID masking database 302 of storage array 106 that shows example VM, port, and logical partition identifiers in the database after initial configuration operation 202 is completed. Database 302 includes four initial authorization rule entries each in the form of either a tuple <VMID, server port ID, NSID> or a tuple <server port ID, storage array port ID, NSID>. The server and storage array port IDs are in the form pWWN. The tuples represent permission rules that collectively indicate/specify authorized/permitted IO accesses between server ports/VMs and storage array ports/logical partitions, across FC fabric zones. The administrator may provide the VMID in the form of a VM UUID. The VM UUID may be resolved into a corresponding <FCID, VIVIID> tuple using Virtual Entity Server (VEID) queries defined by T11 FC-GS-8.

Returning to FIG. 2, at 204, storage array 106 employs TDZ to push or send the initial authorization rules stored in the NSID masking database of storage array 106 to FC fabric 108. FC fabric 108, i.e., FC switches 110, employs TDZ (hosted on the FC switches) to receive from storage array 106 the initial authorization rules, and store them in the FC fabric in a zoning database of FC fabric 108. FC fabric 108 (i.e., FC switches 110) host a zone server application or service (simply referred to as the "zone server") that interacts with TDZ to process the initial authorization rules, as described below. The zone server accepts the VM UUIDs/ VMIDs in conjunction with pWWNs as defined in the initial authorization rules. Thus, at 204, FC switches 110 receive information indicative of the above-mentioned port zoning rules, NSID masking, and VM mappings.

At 206, cooperating with TDZ, the zone server in FC fabric 108 converts the initial authorization rules pushed to FC fabric to ACL rules (final authorization rules) suitable for programming into TCAMs of FC switches 110 (the zone server generates the ACL rules from the information pushed to the zone server in operation 204). In other words, the zone sever combines the port zoning rules, the NSID masking, and the VM mappings into the ACL rules. To do this, the zone server:

a. Expands at least some of the TDZ peer zones represented in the pushed rules into four-tuples of the form: <VIVIID, server pWWN, target pWWN, NSID>; and then
b. Translates each pWWN into a corresponding FCID, which results in final ACL rules in the form of a tuple: <VMID, server FCID, target FCID, NSID>.

The four-tuple ACL rule is more granular than conventional ACL rules, when used in FC fabric 108 for a one-stage authorization enforcement, which avoids a need to also perform a second enforcement action based on NSID in storage array 106. Once programmed into TCAMs, the ACL rules <VMID, server FCID, target FCID, NSID> represent TCAM permit entries that prevent any unauthorized IO operation (e.g., FC CMD IUs, such as read and write) to pass through FC fabric 108. That is, in operation, FC switches 110 lookup the TCAM entries (ACL rules) and compare the identifiers in the entries against corresponding identifiers associated with each IO operation sent from servers 102 to the FC switch ports (intended for storage array 106), as described below in connection with operation 210.

In addition to the above-described four-tuples, the zone server may also generate coarse ACL rules (i.e., ACL rules that are less granular than the four-tuple ACL rules) in the form of a two-tuple <server FCID, target FCID>. The zone server programs the coarse ACL rules in the TCAM below the more granular four-tuple ACL rules, assuming the TCAM rules/entries are searched top to bottom. This ensures backward compatibility and acts as a frame-by-frame granular authorization enforcement as an additional check for data frames (e.g., FC DATA_IUs), which do not carry NSID information.

Figure 4:
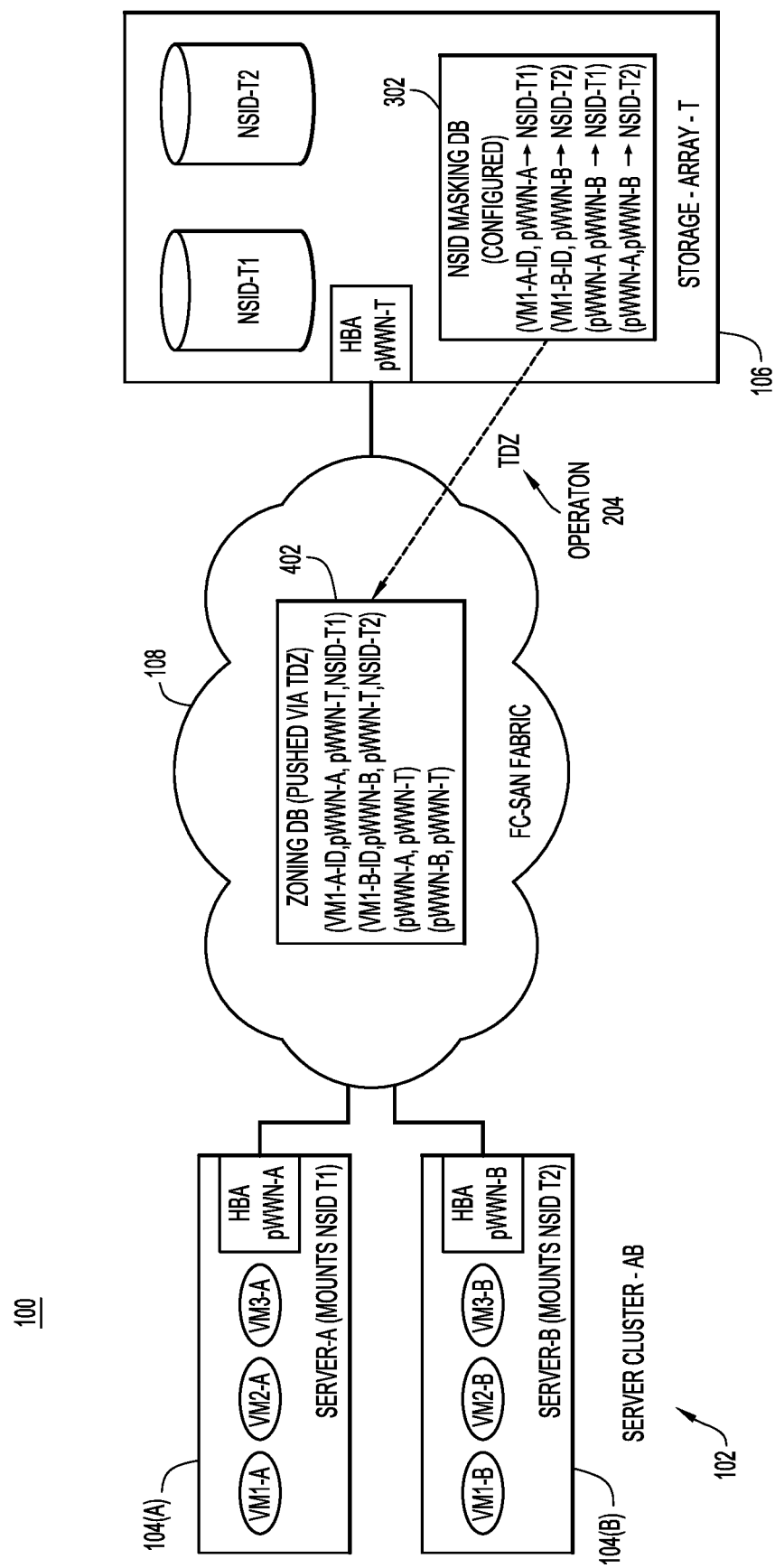
FIG. 4 is an illustration of a zoning database in the FC fabric resulting from a Target Driven Zoning (TDZ) push operation of the method of FIG. 2, according to an example embodiment.

With reference to FIG. 4, there is an illustration of a zoning database 402 of FC fabric 108 that store authorization rules generated in FC fabric 108 from the initial authorization rules of NSID masking database 302 as a result of TDZ and zone server operations performed in operations 204 and 206. As stored in zoning database 402, the authorization rules have not yet been translated to final ACL rules because (i) the pWWNs have not been translated to corresponding FCIDs, and there has been no distribution of final ACL rules in FCID form to appropriate edge FC switches among FC switches 110.

Returning again to FIG. 2, at 208, the zone server (i) distributes the final ACL rules to appropriate portions of FC fabric 108 (e.g., to edge FC switches among FC switches 110 having switch ports that are connected to server and storage array ports), and (ii) programs the TCAMs in FC fabric 108 (e.g., of edge FC switches 110) with the various ACL rules described above.

Figure 5:
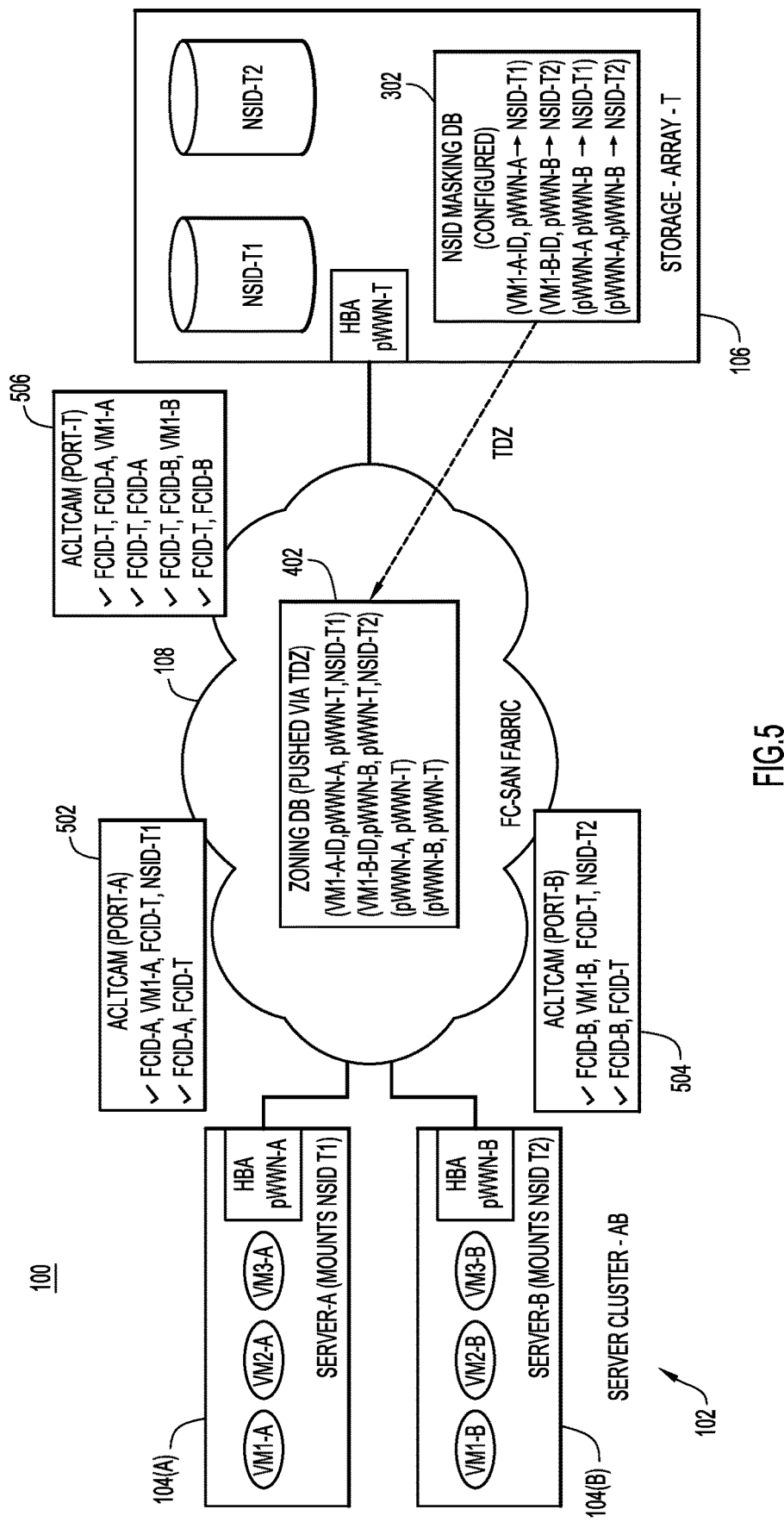
FIG. 5 is an illustration showing Access Control List (ACL) rules as programmed into Ternary Content Addressable Memories (TCAMs) of the FC switch fabric, according to an example embodiment.

With reference to FIG. 5, there is an illustration showing final ACL rules as programmed into FC fabric 108, e.g., into ACL TCAMs 502, 504, and 506 associated with server port pWWN-A, server port pWWN-B, and storage array port pWWN-T, respectively. FC fabric 108 uses the permit entries (ACL rules) of TCAMs 502, 504, and 506 to enforce authorization of IO operations in FC frames flowing through FC fabric 108 between respective ones of server 102(A) and server 102(B), and storage array 106.

As mentioned above, a global VM-UUID may be resolved to a <FCID, local VMID> tuple, which may be achieved by querying a VEID server/service on a given FC switch and ACL rules programmed for the (FCID, VMID) based on zoning configurations. The VEID server/service is a T11 defined FC-GS-8 service that maintains Priority Tagging information. Specifically, the VEID server maintains the mapping of (VM global UUID) to <FCID, VMID>.

It is understood that VMID based zoning is not mandatory for all virtualized servers, and some of the servers may be zoned using the pWWN of the server port, without specifying any VMID. To accommodate this scenario, the zoning entries (ACL rules) are programmed into the respective TCAMs in an order dependent manner with the VMID based zoning entries above all of the non-VM based entries on edge ports of FC switches 110. This prevents a VM from accessing storage arrays/devices zoned with other non-VM based zones on a same server (FCID). For example, assume a server host H1 has VMs VM1, VM2 and zoning is configured as (VM1, T1) and (H1, T2). Then, the ACL rules on the server port are programmed as (H1, VM1, T1)→ permit, followed by a (H1, T2)→ permit. If the order were reversed, then VM1 can also access T2, as the FC frame would still carry a source_FCID=H1.

Zoning on a per-VM, per NSID basis ensures finer security enforcement, and also helps reemphasize a best practice of dedicating NSIDs per VMs to prevent side-effects of an IO-blender effect due to multiple VMs accessing one NSID.

The intent of T11 defined Priority Tagging mechanism is to provide VM visibility to the fabric and to the storage arrays. It was expected that per-VM features could be implemented on the storage arrays due to this ability. However, storage array vendors have not implemented any features around VMs mainly due to two ways of VM tagging defined by the T11 standards. As a result, LUN masking on targets per-VM is not available currently and NSID masking for VMs are also not currently available. Also, since VM tagging is an FC-specific mechanism, storage arrays (which are typically multi-protocol) may implement this feature only on their FC ports. Due to the lack of storage vendor interest to implement VM tagging, performing VM+NSID zoning within FC fabric 108 is advantageous.

Returning to FIG. 2, at 210, FC fabric 108 (i.e., each FC switch 110) enforces the authorization rules programmed into the TCAMs of the FC switches against each IO operation attempted by servers 102 on logical partitions NSID T1 and NSID T2. More specifically, the edge switch ports of FC switches 110 receive from the server ports of servers 102 FC frames carrying IO operations formatted in accordance with the NVMe protocol. Assuming VM tagging of the FC frames, the FC frames each identify, for example, a VMID, a server (or initiator) FCID, a target FCID (for the storage array), and an NSID for the IO operation. Upon receiving each IO operation, the receiving FC switch compares the IO operation (VMID, server FCID, target FCID, NSID) to entries of the local TCAM in search of a match. To do this, the receiving FC switch may use the NSID, the VMID, and/or the FCIDs of the IO operation as one or more indexes into entries of the TCAM in search of a matching TCAM entry.

The compare operation compares the IO operation (VMID, server/target FCIDs, NSID) to corresponding fields of the authorization rule tuples in the TCAM entries. If the compare/search finds a match, the IO operation is authorized, and FC fabric 110 passes the FC frame carrying/conveying the IO operation to storage array 106. If the compare/search does not find a match (i.e., detects a mismatch—there is no matching entry in the TCAM), the IO operation is not authorized and FC fabric 110 does not pass the FC frame carrying the IO operation to storage array 106, i.e., the FC fabric blocks the IO operation. Thus, operation 210 represents a one-stage FC fabric authorization enforcement (i.e., FC fabric-only authorization enforcement) of each attempted IO because the authorization enforcement applies the entirety of the port zoning rules, the NSID masking, and the VM mappings as represented/combined in the ACL rules against each IO operation, obviating the need to perform duplicative authorization enforcement of the NSID masking in storage array 106.

At 212, upon detecting that one of the VMs hosted on one of servers 102 has moved or migrated from that server to a different server, the zone server of FC fabric 108 updates the authorization rules (ACL rules) to reflect that the VM has moved, and reprograms the TCAMs with the updated ACL rules. Specifically, new ACL rules/TCAM entries have to be propagated to whichever server-edge switch port the VM moves. In an embodiment, the zone server is a distributed service, i.e., a service distributed across FC switches 110 in FC fabric 108, and thus can perform operation 210 using a "zone change" protocol based on triggers from VEID server registration updates. That is, the zone server discovers or detects the VM move and its details (i.e., new server and server port identifiers) from the VEID server registration updates. The zone server combines this information with the information in the zoning database to generate the new ACL rules.

Figure 6:
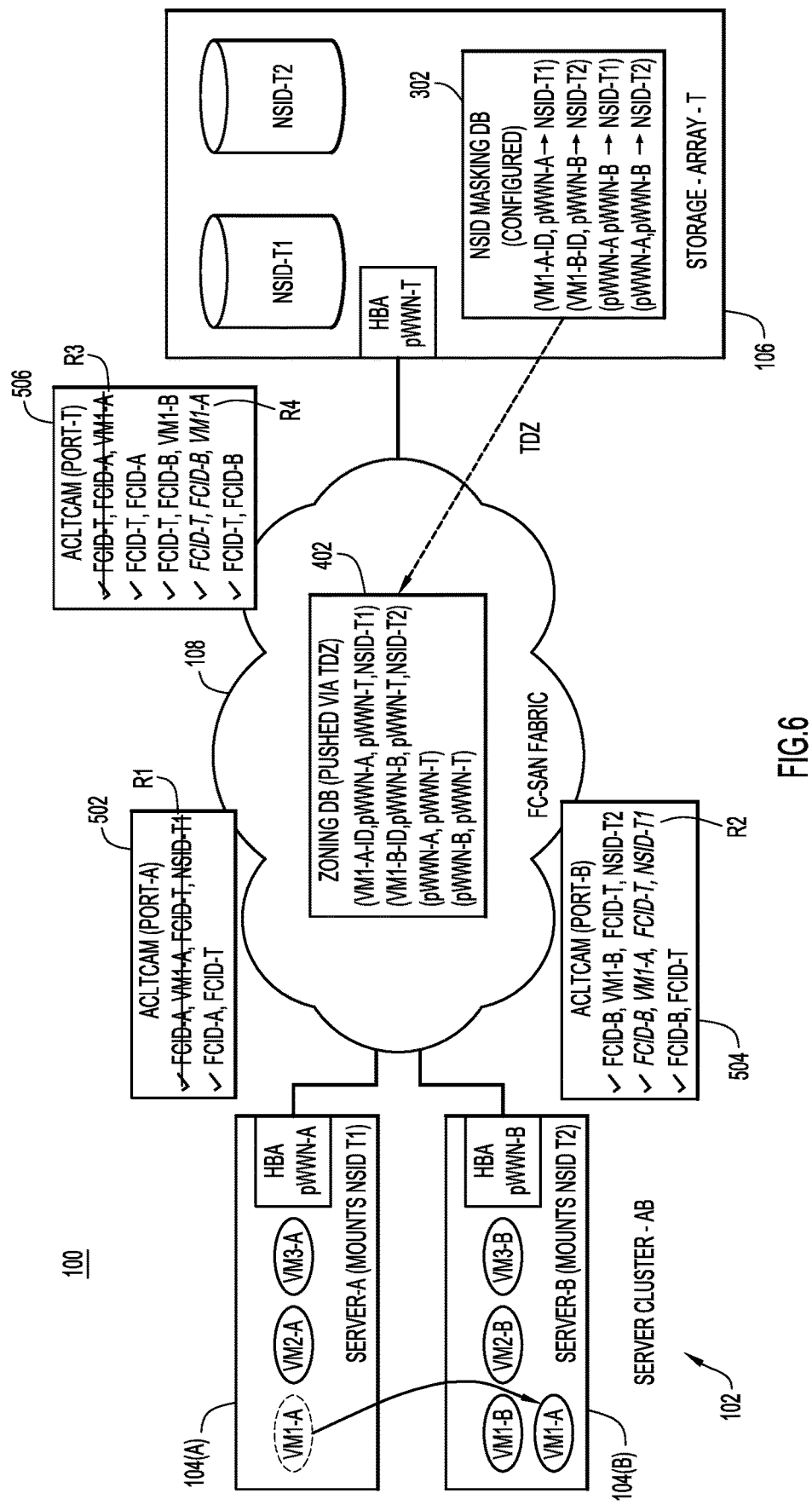
FIG. 6 is an illustration that shows updated TCAM ACLs as a result of a virtual machine (VM) move across servers of the SAN environment, according to an example embodiment.

With reference to FIG. 6, there is an illustration that shows results of operation 212 when VM1-A moves from server 104(A) to server 104(B). As shown in FIG. 6, responsive to the VM move, the zone server:

a. Deletes an original ACL rule R1 programmed into TCAM 502 to disassociate VM1-A from server port pWWN-A of server 104(A) because VM1-A is no longer associated with that server port.
b. Creates, and then programs an entry in TCAM 504 with, a new ACL rule R2 to associate VM1-A with server port pWWN-B of server 104(B).
c. Deletes an original ACL rule R3 programmed into TCAM 506 because VM1-A is no longer associated with FCID-A (server port pWWN-A).
d. Creates, and then programs an entry in TCAM 506 with, a new ACL rule R4 to associate VM1-A with FCID-B (server port pWWN-B).

Figure 7:
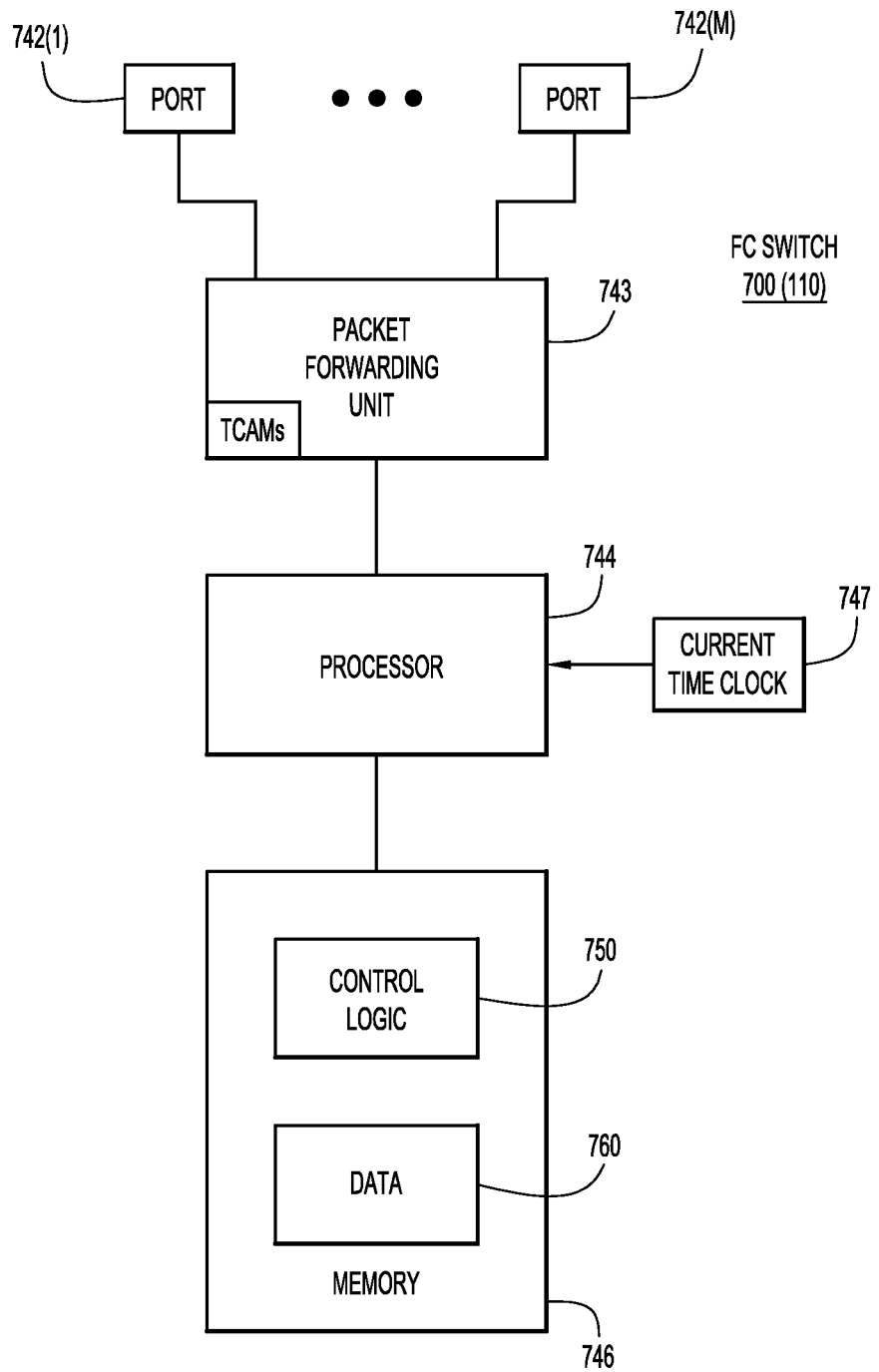
FIG. 7 is a block diagram of an FC switch of the FC switch fabric, according to an example embodiment.

With reference to FIG. 7, there is a block diagram of an FC switch 700 configured to configure and enforce authorization of IO operations as described above. FC switch 700 is representative of each of FC switches 110. Switch 700 comprises a plurality of FC ports 742(1)-742(M) to send FC frames/packets transporting NVMe information to a network (including, e.g., other FC switches in FC fabric 108, servers 104, and storage array 106) and receive FC frames/packets transporting with NVMe information to the network, a packet forwarding/processing unit 743, a network processor 744 (also referred to simply as "processor"), a memory 746, and a current time clock 747 configured to provide time stamps to the ports and/or the network processor. The packet forwarding/processing unit 743 is, for example, one or more application specific integrated circuits that include buffers, queues, and other control logic for performing packet forwarding operations. The packet forwarding/processing unit may include TCAMs for storing ACL entries as described above. The processor 744 is a microcontroller or microprocessor that is configured to perform higher level controls of switch 106. To this end, the memory 746 stores software instructions that, when executed by the processor 744, cause the processor 744 to perform a variety of operations including operations described herein. For example, the memory 746 stores instructions for control logic 750, including, but not limited to, general one-stage zoning logic, TDZ logic, zone server logic, and VEID logic 750 to perform method 200 and other operations described herein. Memory 746 also stores data 760 used and generated by control logic 750. Such data includes ACL rules as described above.

Memory 746 may comprise read only memory (ROM), random access memory (RAM), magnetic disk storage media devices, optical storage media devices, flash memory devices, electrical, optical, or other physical/tangible memory storage devices. Thus, in general, the memory 746 may comprise one or more tangible (e.g., non-transitory) computer readable storage media (e.g., a memory device) encoded with software comprising computer executable instructions and when the software is executed (by the processor 744) it is operable to perform the operations described herein in connection with logic 750.

In summary, embodiments presented herein include FC switches, of an FC fabric connected to an NVMe initiator device (e.g., server) and a NVMe target device (e.g., storage array), configured to provide an efficient authorization mechanism that makes authorization decisions/enforcements at a fine level of granularity of VMIDs and NSIDs. The FC fabric switches receives zoning instructions from the FC-NVMe storage target using TDZ principles and update the zoning database on the zone server; establishing NSID zone sets and activation of updated NSID zone sets. Authorization enforcement combines port zoning and NSID masking (with optional FC-VMID credentials) into a single lookup instruction in TCAM in hardware. This efficiency simplifies authorization management and reduces IO path latency, which is important in FC-NVMe networks. Overall, the embodiments obviate the need to perform any authorization on the storage array thereby reducing latency of NVMe-IO operations which is critical when performed over FC-fabrics.

While embodiments focus on FC-NVMe, the features and methods described above may be applied to other storage media protocols like SCSI-FCP or using alternate transport mechanism like FC over Ethernet and the like.

In summary, in one form, a method is provided comprising: at a Fibre Channel (FC) switch of an FC switch fabric through which servers connected to the FC switch fabric access logical partitions of a storage array connected to the FC switch fabric, wherein the FC switch, the servers, and the storage array each include multiple ports: receiving from the storage array information indicative of port zoning rules and logical partition masking that collectively define which server ports are permitted access to which storage array ports and to which logical partitions of the storage array; generating from the information authorization rules for enforcing the port zoning rules and the logical partition masking, and programming the authorization rules into memory; receiving at the switch ports FC frames from the server ports, the FC frames conveying respective input-output (IO) operations destined for the logical partitions; and authorizing each IO operation based on a lookup of the programmed authorization rules to enforce both the zoning rules and the logical partition masking on the IO operation at the switch. One of the mechanisms by which zoning rules can be enforced is for the storage array to derive the zoning rules from a masking configuration, e.g., a LUN or NSID masking configuration, and push the zoning rules to the fabric.

In another form, an apparatus is provided comprising: switch ports configured to be connected to a Fibre Channel (FC) switch fabric through which servers connected to the FC switch fabric access logical partitions of a storage array connected to the FC switch fabric, wherein the servers and the storage array each include multiple respective ports; and a processor coupled to the switch ports and configured to perform: receiving from the storage array information indicative of port zoning rules and logical partition masking that collectively define which server ports are permitted access to which storage array ports and to which logical partitions of the storage array; generating from the information authorization rules for enforcing the port zoning rules and the logical partition masking, and programming the authorization rules into memory; receiving at the switch ports FC frames from the server ports, the FC frames conveying respective input-output (IO) operations destined for the logical partitions; and authorizing each IO operation based on a lookup of the programmed authorization rules to enforce both the zoning rules and the logical partition masking on the IO operation at the switch.

In yet another form, a non-transitory computer readable medium is provided. The computer readable medium is encoded with instruction that, when executed by a processor of a Fibre Channel (FC) switch of an FC switch fabric through which servers connected to the FC switch fabric access logical partitions of a storage array connected to the FC switch fabric, wherein the FC switch, the servers, and the storage array each include multiple ports, cause the processor to perform: receiving from the storage array information indicative of port zoning rules and logical partition masking that collectively define which server ports are permitted access to which storage array ports and to which logical partitions of the storage array; generating from the information authorization rules for enforcing the port zoning rules and the logical partition masking, and programming the authorization rules into memory; receiving at the switch ports FC frames from the server ports, the FC frames conveying respective input-output (IO) operations destined for the logical partitions; and authorizing each IO operation based on a lookup of the programmed authorization rules to enforce both the zoning rules and the logical partition masking on the IO operation at the switch.

The above description is intended by way of example only. Various modifications and structural changes may be made therein without departing from the scope of the concepts described herein and within the scope and range of equivalents of the claims.

What is claimed is:

1. A method, comprising:
   at a Fibre Channel (FC) switch of an FC switch fabric through which servers connected to the FC switch fabric access logical partitions of a storage array connected to the FC switch fabric, wherein the FC switch, the servers, and the storage array each include multiple ports:
   receiving, from the storage array, information indicative of port zoning rules, logical partition masking, and virtual machine mappings that collectively define which server ports are permitted access to which storage array ports and to which of the logical partitions of the storage array, and that defines virtual machine access to the logical partitions, switch ports, and the server ports;
   generating, from the information, authorization rules for enforcing the port zoning rules, the logical partition masking, and the virtual machine mappings, and programming the authorization rules into memory;
   receiving at the switch ports FC frames from the server ports, the FC frames conveying respective input-output (IO) operations destined for the logical partitions; and
   authorizing each IO operation based on a lookup of the programmed authorization rules to enforce the port zoning rules, the logical partition masking, and the virtual machine mappings on the IO operation at the switch.

2. The method of claim 1, wherein:
   the generating includes generating each of at least some of the authorization rules as a tuple of a form <server port identifier, storage array port identifier, and logical partition identifier>; and
   the programming includes programming the tuples as respective entries in the memory.

3. The method of claim 2, wherein the authorizing each IO operation includes:
   comparing a server port identifier, a storage array port identifier, and a logical partition identifier specified in the IO operation against corresponding identifiers in the programmed tuples; and
   if the comparing results in either a match or a mismatch, either allowing the IO operation to pass to the storage array or blocking the IO operation from the storage array, respectively.

4. The method of claim 2, wherein:
   the programming includes programming the tuples in a ternary content-addressable memory (TCAM) in the switch; and
   the authorizing each IO operation includes comparing the server port identifier, the storage array port identifier, and the logical partition identifier specified in the IO operation against the tuples in the TCAM.

5. The method of claim 2, wherein:
   the generating includes translating port World Wide Names (pWWNs) of the server ports and the storage array ports to corresponding FC identifiers for the tuple, respectively.

6. The method of claim 1, wherein:
   the servers are configured to host virtual machines and the virtual machine mappings further define which of the virtual machines are permitted access to which of the logical partitions through which of the switch ports and which of the server ports;
   the generating includes generating from the information the authorization rules such that the authorization rules combine the port zoning rules, the logical partition masking, and the virtual machine mappings.

7. The method of claim 6, wherein:
   the generating includes generating each of at least some of the authorization rules as a tuple of a form <virtual machine identifier, server port identifier, storage array port identifier, and logical partition identifier>; and
   the programming includes programming the tuples as respective entries in an authorization table.

8. The method of claim 7, wherein the authorizing each IO operation includes:
   comparing a virtual machine identifier, a server port identifier, a storage array port identifier, and a logical partition identifier specified by the IO operation against corresponding identifiers in the programmed tuples; and if the comparing results in either a match or a mismatch, either allowing the IO operation to pass to the storage array or blocking the IO operation from the storage array, respectively.

9. The method of claim 6, further comprising:

upon detecting that a first virtual machine among the virtual machines has moved from a first server to a second server among the servers, updating the authorization rules to reflect that the first virtual machine has moved, and reprogramming the memory with the updated authorization rules.

10. The method of claim 1, wherein:

the receiving the FC frames includes receiving the FC frames in accordance with a FC-over-Nonvolatile Memory express (NVMe) protocol such that FC frames convey the IO operations as NVMe formatted IO operations.

11. The method of claim 1, wherein the IO operations include read operations and write operations.

12. The method of claim 1, wherein the logical partitions are identified by namespace identifiers (NSIDs).

13. An apparatus comprising:

switch ports of a Fibre Channel (FC) switch configured to be connected an FC switch fabric through which servers connected to the FC switch fabric access logical partitions of a storage array connected to the FC switch fabric, wherein the servers and the storage array each include multiple respective ports; and a processor coupled to the switch ports and configured to perform:

receiving, from the storage array, information indicative of port zoning rules, logical partition masking, and virtual machine mappings that collectively define which server ports are permitted access to which storage array ports and to which of the logical partitions of the storage array, and that defines virtual machine access to the logical partitions, the switch ports, and the server ports:

generating, from the information, authorization rules for enforcing the port zoning rules and, the logical partition masking, and the virtual machine mappings, and programming the authorization rules into memory;

receiving at the switch ports FC frames from the server ports, the FC frames conveying respective input-output (IO) operations destined for the logical partitions; and authorizing each IO operation based on a lookup of the programmed authorization rules to enforce the port zoning rules, the logical partition masking, and the virtual machine mappings on the IO operation at the FC switch.

14. The apparatus of claim 13, wherein the processor is configured to perform:

the generating by generating each of at least some of the authorization rules as a tuple of a form <server port identifier, storage array port identifier, and logical partition identifier>; and the programming by programming the tuples as respective entries in the memory.

15. The apparatus of claim 14, wherein the processor is configured to perform the authorizing each IO operation by:

comparing a server port identifier, a storage array port identifier, and a logical partition identifier specified in the IO operation against corresponding identifiers in the programmed tuples; and if the comparing results in either a match or a mismatch, either allowing the IO operation to pass to the storage array or blocking the IO operation from the storage array, respectively.

16. The apparatus of claim 13, wherein the servers are configured to host virtual machines and the virtual machine mappings further define which of the virtual machines are permitted access to which of the logical partitions through which of the switch ports and which of the server ports, and the processor is configured to perform the generating by generating from the information the authorization rules such that the authorization rules combine the port zoning rules, the logical partition masking, and the virtual machine mappings.

17. A non-transitory computer readable medium encoded with instructions that, when executed by a processor of a Fibre Channel (FC) switch of an FC switch fabric through which servers connected to the FC switch fabric access logical partitions of a storage array connected to the FC switch fabric, wherein the FC switch, the servers, and the storage array each include multiple ports, cause the processor to perform:

receiving, from the storage array, information indicative of port zoning rules, logical partition masking, and virtual machine mappings that collectively define which server ports are permitted access to which storage array ports and to which of the logical partitions of the storage array, and that defines virtual machine access to the logical partitions, switch ports, and the server ports:

generating, from the information, authorization rules for enforcing the port zoning rules, the logical partition masking, and the virtual machine mappings, and programming the authorization rules into memory;

receiving at the switch ports FC frames from the server ports, the FC frames conveying respective input-output (IO) operations destined for the logical partitions; and authorizing each IO operation based on a lookup of the programmed authorization rules to enforce the port zoning rules, the logical partition masking, and the virtual machine mappings on the IO operation at the switch.

18. The non-transitory computer readable medium of claim 17, wherein:

the instructions to cause the processor to perform the generating include instructions to cause the processor to perform generating each of at least some of the authorization rules as a tuple of a form <server port identifier, storage array port identifier, and logical partition identifier>; and the instructions to cause the processor to perform the programming include instructions to cause the processor to perform programming the tuples as respective entries in the memory.

19. The non-transitory computer readable medium of claim 18, wherein the instructions to cause the processor to perform the authorizing each IO operation include instructions to cause the processor to perform:

comparing a server port identifier, a storage array port identifier, and a logical partition identifier specified in the IO operation against corresponding identifiers in the programmed tuples; and if the comparing results in either a match or a mismatch, either allowing the IO operation to pass to the storage array or blocking the IO operation from the storage array, respectively.

20. The non-transitory computer readable medium of claim 17, wherein:
- the servers are configured to host virtual machines and the virtual machine mappings further define which of the virtual machines are permitted access to which of the logical partitions through which of the switch ports and which of the server ports; and
- the instructions to cause the processor to perform the generating include instructions to cause the processor to perform generating from the information the authorization rules such that the authorization rules combine the port zoning rules, the logical partition masking, and the virtual machine mappings.

* * * * *